(12) United States Patent
Tsakiris

(10) Patent No.: US 8,342,475 B2
(45) Date of Patent: Jan. 1, 2013

(54) MOUNTING BRACKET AND DAMPER SYSTEM FOR HANGING AND USE OF A PUNCHING BAG

(76) Inventor: Peter Tsakiris, Ocean Township, NJ (US)

( * ) Notice: Subject to any disclaimer, the term of this patent is extended or adjusted under 35 U.S.C. 154(b) by 513 days.

(21) Appl. No.: 12/462,614

(22) Filed: Aug. 6, 2009

(65) Prior Publication Data

US 2010/0032544 A1 Feb. 11, 2010

Related U.S. Application Data

(60) Provisional application No. 61/188,124, filed on Aug. 6, 2008.

(51) Int. Cl.
*F16M 13/00* (2006.01)
(52) U.S. Cl. ........ 248/611; 248/636; 248/693; 248/343; 482/86; 482/87; 482/89
(58) Field of Classification Search .................. 248/610, 248/611, 636, 343, 317, 613, 617, 618, 620, 248/622, 323; 482/83, 87, 89, 86, 90
See application file for complete search history.

(56) References Cited

U.S. PATENT DOCUMENTS

| 5,224,912 | A | * | 7/1993 | Moody ........................... 482/87 |
| 6,090,018 | A | * | 7/2000 | Laudenslager et al. ......... 482/87 |
| 8,091,849 | B2 | * | 1/2012 | Ayadhi .......................... 248/323 |
| 2007/0158522 | A1 | * | 7/2007 | Shahrokhi ..................... 248/429 |

* cited by examiner

*Primary Examiner* — Amy Sterling
*Assistant Examiner* — Todd M Epps
(74) *Attorney, Agent, or Firm* — Clifford G. Frayne

(57) ABSTRACT

A mounting bracket and dampening assembly for mounting a heavy bag, a first portion of the mounting bracket mounted horizontally in relation to mounting surface, a second portion of the mounting bracket depending downwardly forming a support surface for a securing means for supporting the heavy bag in combination with a dampening means in the form of upper and lower bushings in combination with a rod and spring assembly to lessen the transmission of stress, shock and vibration and to reduce the motion, both lateral and vertical, of the heavy bag.

14 Claims, 9 Drawing Sheets

MOUNTING BRACKET AND DAMPER SYSTEM FOR HANGING AND USE OF A PUNCHING BAG

RELATED APPLICATIONS

Applicant claims the benefit of provisional application Ser. No. 61/188,124, filed Aug. 6, 2008.

BACKGROUND OF THE INVENTION

1. Field of the Invention

The present invention relates to exercise equipment, and more particularly, to heavy bags used in boxing and the martial arts, and for other athletic purposes, and in particular for a mounting and dampening system for a heavy bag.

2. Description of the Prior Art

Certain punching bags are known as heavy bags and are used in boxing, martial arts, and other athletic activities. The most common heavy bag is generally cylindrical in shape and up to six feet in length. It is filled with stuffing material, most commonly in the form of cut up rags, which are densely stuffed into the outer liner. However, the bag may sometimes be filled with sand, liquid gel, foam, or any other suitable energy absorbing material. Thus the heavy bag is of significant weight.

Since the heavy bag is subjected to repeated blows not only by the hands, but also by the feet, knees, and other body portions utilized by boxers, martial artists, and extreme sports athletes, the heavy bag experiences significant stress, as does its mounting structure. The heavy bag is normally hung vertically, and vibrations from its being struck can be transmitted upwardly through its support to its mount and into support structure and beyond.

The heavy bag is typically mounted from horizontal or vertical surfaces comprised of steel, wood or other structural members to insure that it can support its weight and absorb the stresses from use without tearing loose from its mount.

Many athletes, both amateur and professional, who practice boxing, martial arts, or other athletic activity which may involve the use of the heavy bag, would like the option of installing a heavy bag in their residences so that they could practice their athletic activity without the need to travel to a gym or other athletic facility. The mounting of such a heavy bag in a standard residential structure presents difficulties because of the stresses involved and the potential need to modify structural elements causing damage to a finished ceiling, support beam, or the like, which would likely be anticipated.

Applicant's mount and dampening assembly allows for the mounting and installation of a heavy bag in a gym, training facility, or residential dwelling in a secure manner which allows for an individual to practice all of the athletic uses associated with the heavy bag without subjecting support structure to undue forces.

The system also minimizes and mitigates shock, motion and vibration from heavy bag resulting in a substantial reduction in forces that might otherwise transmit into the structure and disturb individuals in adjacent rooms or in the same or adjacent structures. The system also relieves stresses on the bag which prevent accelerated wear, tear, and bag settling, as well as reducing wear and tear on joints of the hands, wrists, and feet of the user.

OBJECTS OF THE INVENTION

An object of the present invention is to provide for a dampening system which can be mounted to a horizontal or vertical structural mounting surface from which a heavy bag may depend.

Another object of the present invention is to provide for a novel mounting bracket which is easily installed and secured without causing significant damage to the ceiling.

A still further object of the present invention is to provide for a novel mounting system which also incorporates a dampening mechanism which significantly lessens the transmission of any stress placed upon the heavy bag from being transmitted to the mounting structure.

A still further object of the present invention is to provide for a novel mounting bracket and dampening mechanism which is easily installed and uninstalled.

A still further object of the present invention is to provide for a novel dampening system which significantly lessens harsh and unwanted bag motion allowing user to have a more productive workout by reducing the amount of time and frequency user spends resetting bag or waiting for bag to return to neutral position.

A still further object of the present invention is to provide a system which reduces stresses and wear and tear to the joints of the user's body engaged in training activity through the mitigation of forces which the heavy bag cannot absorb being in excess of heavy bag's design limits.

A still further object of the present invention is to provide for a novel mounting and dampening system which relieves and minimizes stresses to the heavy bag resulting in reduction of wear, tear, and internal settling of the bag contents, resulting in extended bag life.

SUMMARY OF THE INVENTION

A mounting bracket and dampening assembly for mounting a heavy bag, a first portion of the mounting bracket mounted horizontally in relation to mounting surface, a second portion of the mounting bracket depending downwardly forming a support surface for a securing means for supporting the heavy bag in combination with a dampening means in the form of upper and lower bushings in combination with a rod and spring assembly to lessen the transmission of stress, shock and vibration and to reduce the motion, both lateral and vertical, of the heavy bag.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
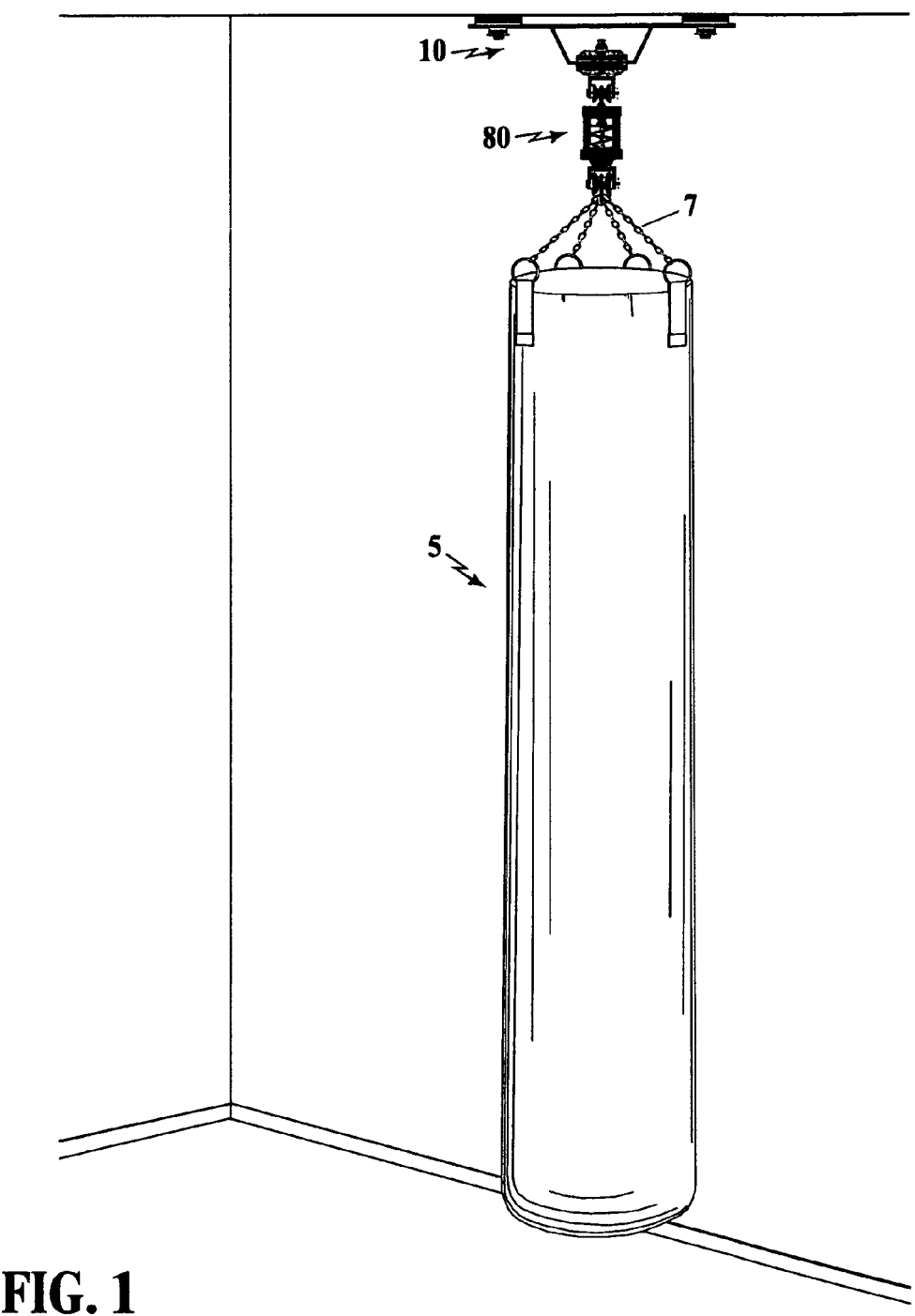
FIG. 1 is a perspective view of a heavy bag with the mounting and dampening system of the present invention.

FIG. 1 is a perspective view of a typical heavy bag 5 which is generally cylindrical in shape and formed of an outer shell of canvass, leather, or the like. The heavy bag can vary in size, but is normally up to six feet long. The heavy bag contains a plurality of flexible supports 7 which extend upwardly from the top of the heavy bag for mounting or hanging the heavy bag from a support, in this case as illustrated in FIG. 1, a ceiling.

The support provided a heavy bag in a gymnasium or training center normally does not present a problem in that the ceiling is fabricated from steel girders or the like, or a separate steel support structure can be fabricated within the building from which to hang the heavy bag. However, more and more people are seeking to exercise and work out with a heavy bag, and oftentimes desire to position a heavy bag in their home, be it the basement, garage, or a room. In such a situation, the striking of the heavy bag with the fists, feet, or other anatomical parts of the bodies as accomplished by a martial artist, will cause vibration and shock to be transmitted to the structure from which the heavy bag is depending. It is therefore desirable to have a mounting system which dampens the vibration and shock that can be transmitted to the overlying structure when the heavy bag is struck.

Applicant's mounting system consists of a dampened mounting bracket 10, as more fully discussed hereafter, and an inline dampening mechanism 80, as more fully described hereafter, which can be used in conjunction with bracket 10 to form the entire mounting system, or the inline dampening mechanism 80 may be incorporated in other undampened mounting brackets to reduce motion, shock and vibration. As such it is an integral part of the system, but also can be a stand alone item for use with other types of mounting brackets.

Figure 3:
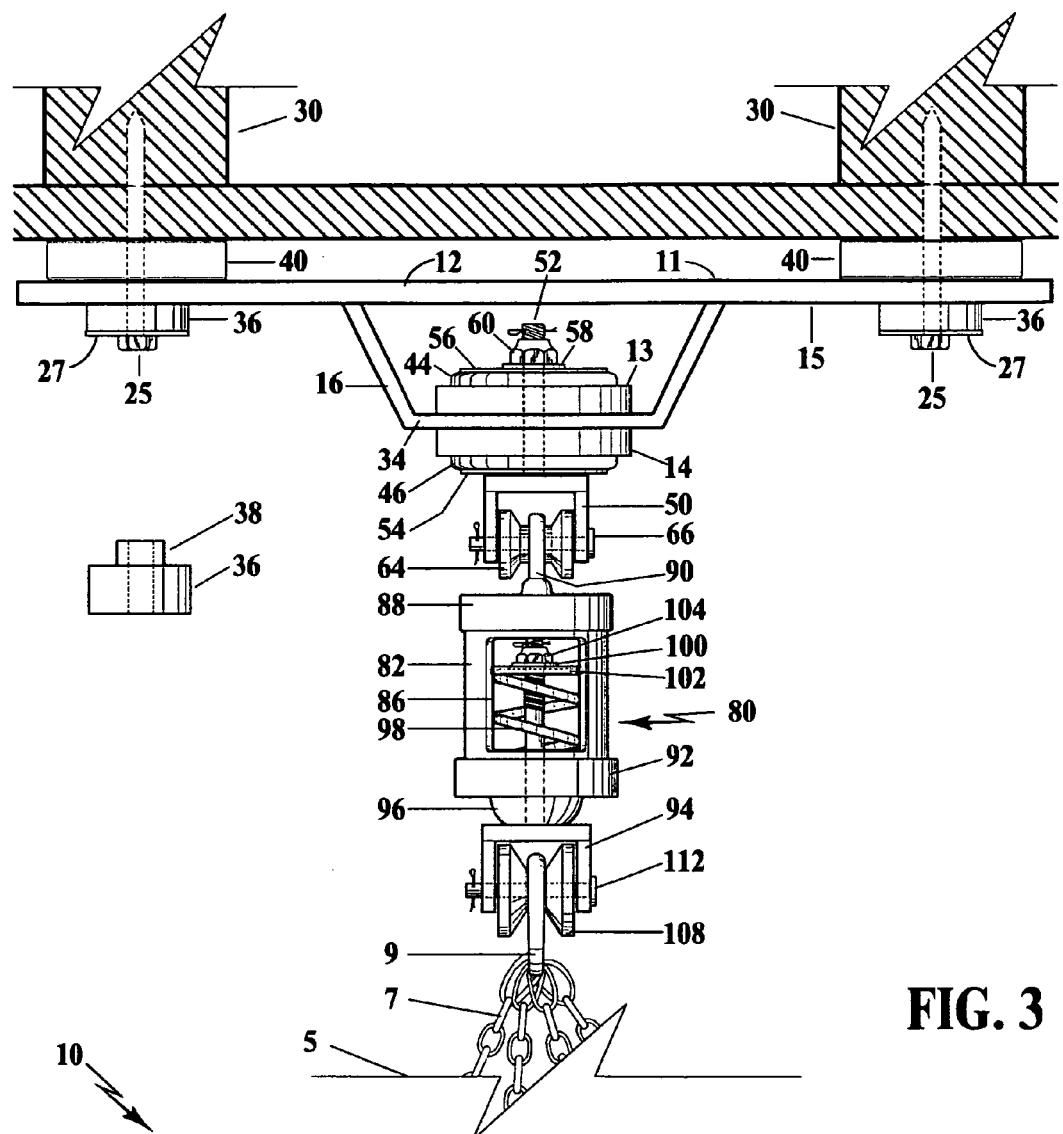
FIG. 3 is a side partially exploded view of the mounting bracket and dampening system of the present invention.
Figure 2:
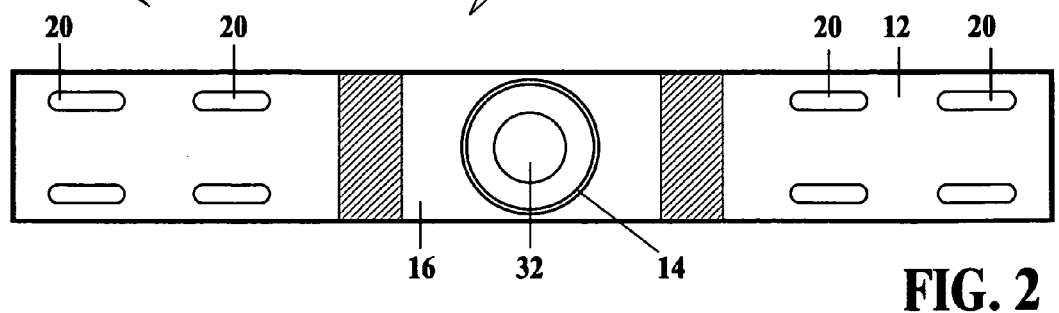
FIG. 2 is a bottom view of a mounting bracket of the present invention.

FIG. 2 is a bottom view of the preferred mounting bracket of the present invention, and FIG. 3 is a side view of the preferred mounting bracket of the present invention, together with additional dampening mechanisms.

Mounting bracket 10 comprises a planar ceiling plate 12 having a lower surface 15 and an upper surface 11. Integrally formed to the central portion of ceiling plate 12 is a transverse U-shaped section member 16 which depends from the lower surface 15 of planar ceiling plate 12 and is secured to planar ceiling plate 12 by welding or other suitable means. Planar ceiling plate 12 is formed with a plurality of slotted apertures 20 for the selective positioning of fasteners 25 in the forms of bolts or heavy duty screws to be inserted into the ceiling joists as discussed hereafter. Slotted apertures 20 allow for the installer to locate the positioning of ceiling joists 30 so that the fasteners may be secured thereto.

In the preferred embodiment, the mounting bracket 10 would be installed perpendicular to the direction of the ceiling joists 30 so that the weight of the heavy bag is distributed over two or more ceiling joists. Depending upon the length of the ceiling bracket 12, and the length of the slotted apertures 20, the mounting bracket 10 can be secured to at least two parallel ceiling joists 30, but depending on the spacing of the ceiling joists 30, and the size of mounting bracket 10, and in particular the ceiling plate 12, more than two ceiling joists may be engaged by the fastening means to secure mounting bracket 10. The preferred embodiment is designed to be used in situations with finished ceiling.

Transverse U-section member 16 is formed with an aperture 32 in its mounting plate 34 for receipt of a securing means. Mounting plate 34 is also formed with an integral annular wall 13 and 14 on its upper and lower surface for receipt of dampening means.

The dampening system associated with mounting bracket 10 as illustrated in FIG. 3 comprises several elements. Initially, the fasteners 25 are fitted with a washer 27 abutting the head of fastener 25. A dampening bushing 36 is then juxtaposed washer 27, dampening bushing 36 having a nose piece 38 which corresponds to the thickness of the ceiling plate 12 and sits within respective slot 20. In this configuration the fastener is then positioned through a slot 20 and a second dampening bushing 40 is positioned on fastener 25. Fastener 25 is then secured to the ceiling joist 30 or overhead support. In this configuration it can be seen that the ceiling plate 12 as a result of the positioning of dampening bushings 40 is offset from the actual surface of the ceiling.

The second dampening means associated with the mounting bracket 10 comprises a pair of doughnut-shaped dampening bushings 44 and 46. These bushings are fitted within the annular walls 13 and 14 formed on the upper and lower surface of mounting plate 34. In the preferred embodiment, a clevis 50 and bolt 52 is utilized to secure these bushings. Initially, a washer 54 is inserted onto the clevis bolt 52 and the clevis bolt is inserted through the aperture 32 in mounting plate 34 extending upwardly and through the doughnut-shaped bushings 44 and 46. An upper washer 56, a lock washer 58, and a nut 60, are then secured to the upper end of the clevis bolt 52 and secured so as to compress the doughnut-shaped dampening bushings 44 and 46.

The clevis 50 supports a transverse roller 64 supported upon a shaft 66.

Roller 64 supports an inline dampening member referred to generally as 80 which provides additional dampening to the system. The inline dampener 80 comprises housing member 82, which in the preferred embodiment includes a segmented cylindrical side wall 84 having a plurality of windows 86, a removable top member 88 secured to the cylindrical side wall, the top member 88 having an eyebolt 90 secured thereto which is securable to roller 64 depending from mounting bracket 10. The lower end 92 of the inline dampening member 80 is removable and is secured to the cylindrical sidewall. A second clevis and bolt assembly 94, the bolt portion extending upwardly through an inline dampener bushing 96 which may be positioned both above and below the bottom wall 92 of the inline dampener. The bolt portion of the clevis and bolt assembly 94 extends further upwardly within the housing member 84 through a helically biased spring member 98. The threaded end portion of the bolt is fixed with a spring cap 102, a friction reducing thrust washer bearing 100, and nut member 104, which is accessed through the plurality of windows 86 in the housing member 82. The nut member 104 is selectively loosened or tightened to adjust the dampening of the inline dampener. Washer 100 allows bolt to rotate without torquing spring.

The clevis 94 is again fitted with a roller member 108 mounted on a shaft member 110 extending between the arms of the clevis 94. The upstanding supports 7 of the heavy bag 5 terminate with a ring member 9, which ring member is positioned on the roller 108 of the clevis member 94 which depends from the inline dampener 80.

In the preferred embodiment as illustrated in FIGS. 2 and 3, the roller members 64 and 108 could be fashioned of any material, but would preferably be an elastomeric material to further enhance the overall dampening system. All of the dampening bushings identified with respect to the preferred embodiment, could be fabricated of any suitable elastomeric, rubber material or encapsulated gas, gel, encapsulated liquids or biasing means.

Figure 6:
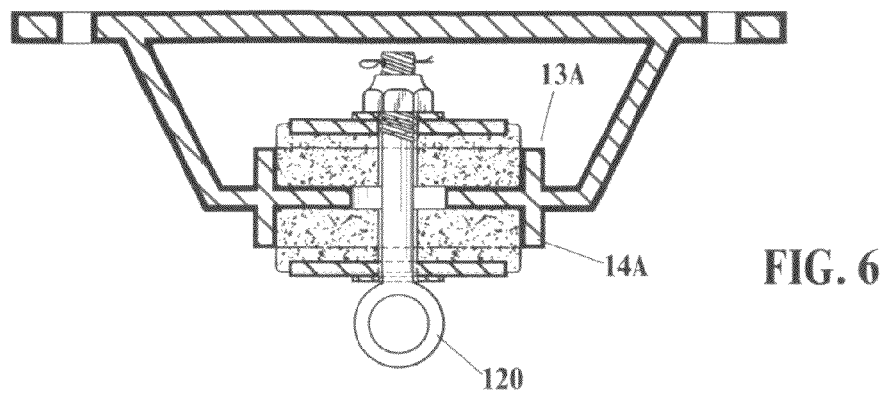
FIG. 6 is a partial side view of the second embodiment of the mounting bracket of the present invention.
Figure 5:
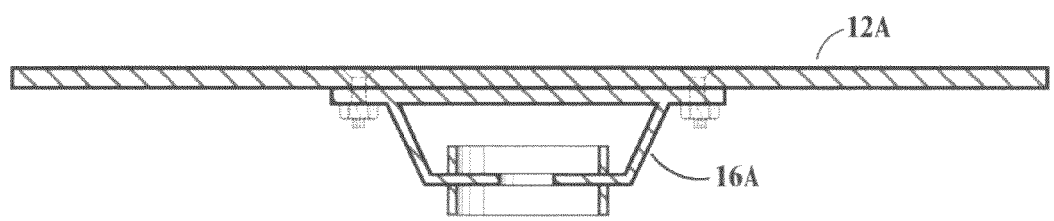
FIG. 5 is a side view of a second embodiment of the mounting bracket of the present invention.
Figure 4:
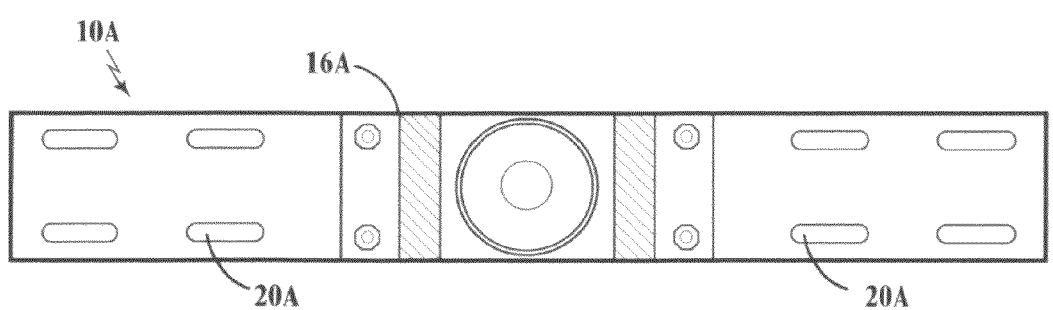
FIG. 4 is a bottom view of a second embodiment of the mounting bracket of the present invention.

FIG. 4 is a bottom view of a second embodiment of the mounting bracket 10A, and FIG. 5 is a side view of a portion of the mounting bracket 10A of FIG. 4. FIG. 6 is a partial cutaway view of the mounting plate of the second embodiment. Mounting bracket 10A functions in the same manner as mounting bracket 10 of the preferred embodiment. The differences include the fact that the transverse U-shaped support member 16A is not integral with the ceiling plate 12A, but rather is bolted onto the ceiling plate 12A using fasteners. It has the same configuration as the preferred embodiment and like reference numerals identify elements including slots 20A. This embodiment shows an alternative eyebolt 120 assembly with the associated washers and nut to secure the doughnut-shaped dampening bushings within the annular wall receptacles 13A and 14A.

Figure 8:
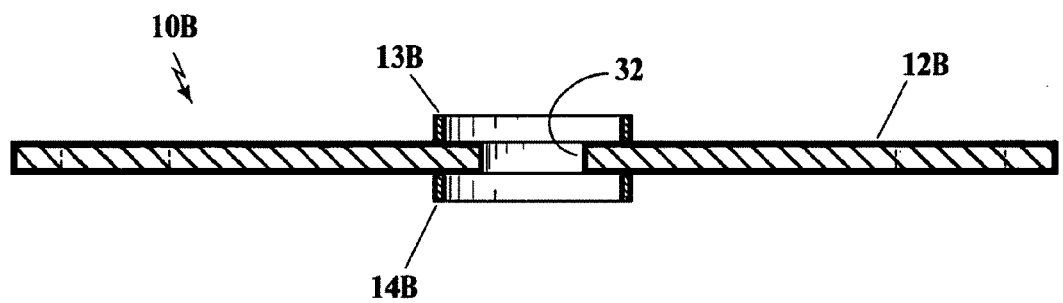
FIG. 8 is a side view of the third embodiment of the mounting bracket of the present invention.
Figure 7:
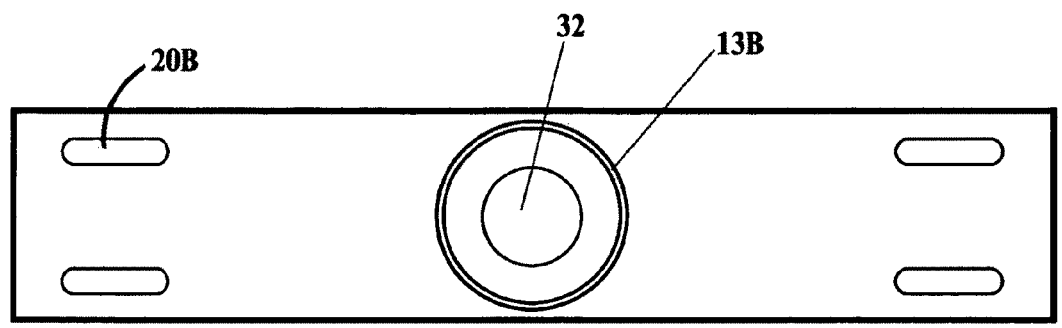
FIG. 7 is a bottom view of a third embodiment of the mounting bracket of the present invention.

FIGS. 7 and 8 are a third embodiment of a mounting bracket 10B in which the annular walls 13B and 14B are positioned directly on the ceiling plate 12B. The ceiling plate contains the respective slots 20B for securing it to the ceiling joists utilizing the same dampening bushing system as described with respect to FIGS. 2 and 3. This embodiment is designed to be used in situations when there is no finished ceiling. Upper bushing, clevis bolt and fastening hardware project above plane line allowing maximum space between floor and mount.

Figure 9:
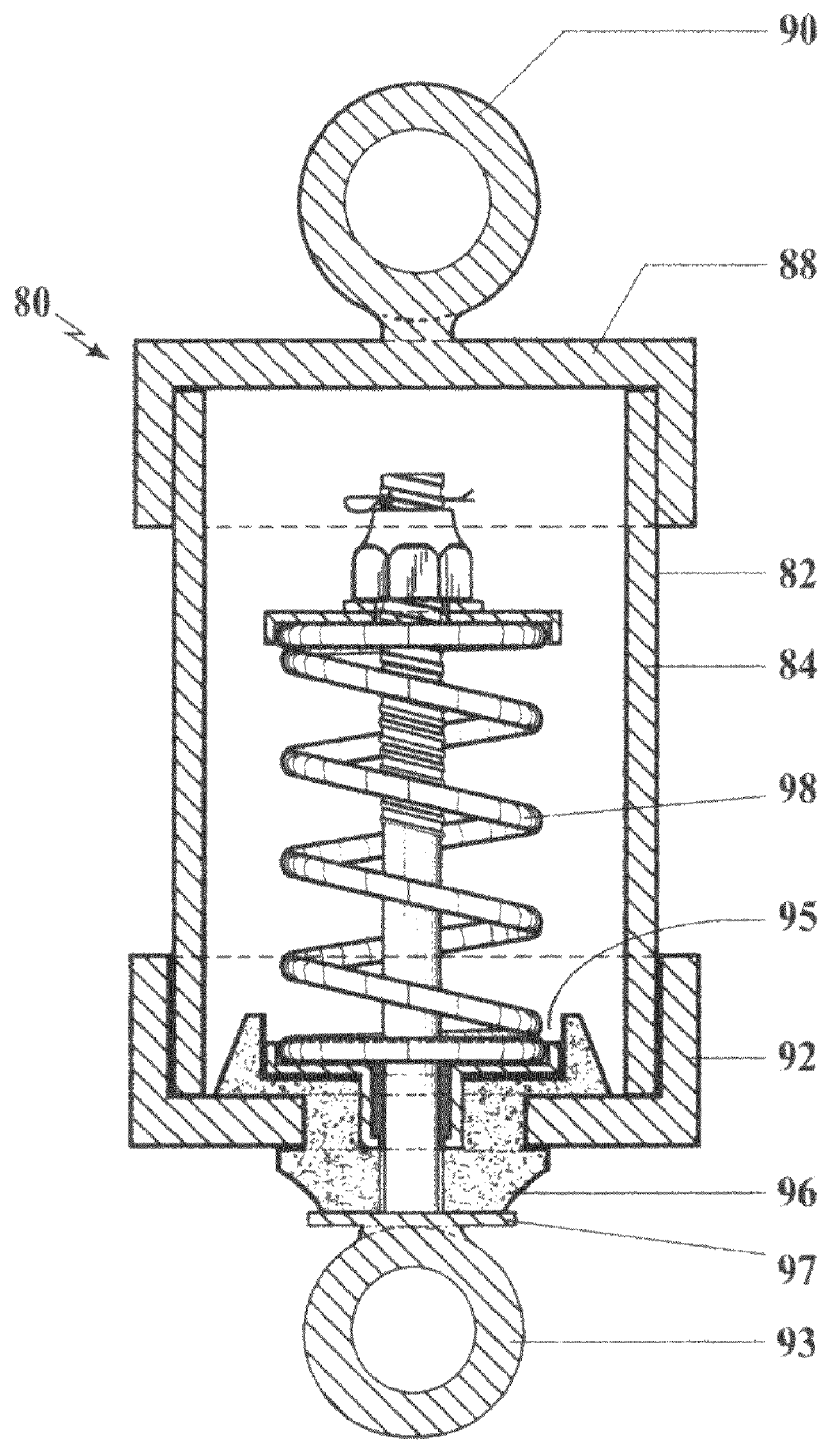
FIG. 9 is a cutaway view of an inline dampener utilizing a support eyebolt.

FIG. 9 is a cross sectional view of an inline dampening member 80, which includes housing member 82, cylindrical side wall 84, a top member 88 and an eye ring 90 secured thereto. The lower end 92 of the inline dampening member 80 is removably secured and has a depending eyebolt 93. Eyebolt 93 extends upwardly through an inline dampening bushing 96 which includes a sleeve washer which is snap fit into the bottom wall and maintained by its own compression forces but may also be maintained in position by upper and lower washers 95 and 97. The helical spring biasing means 98 is positioned on the eyebolt 93, above upper washer 95, through which the eyebolt extends, the eyebolt terminating in a friction reducing thrust washer, cap, and nut. In this embodiment, the clevis has been substituted with an eyebolt, but it will be recognized that either fastener/support could be utilized.

Figure 10:
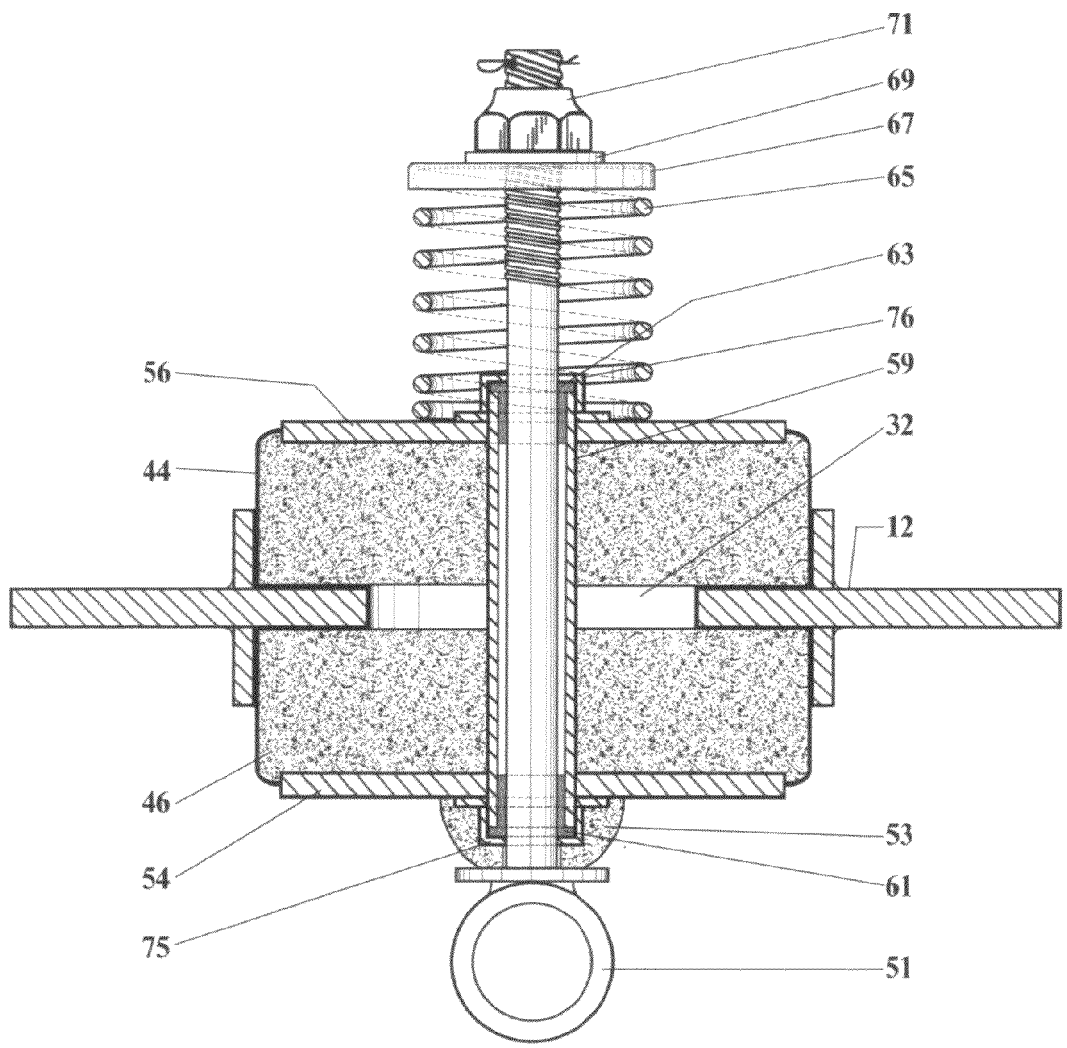
FIG. 10 is a cross-sectional view of a fixed mount dampener which may be used with mounting brackets illustrated in FIGS. 2-8.

FIG. 10 is a cross sectional view of a fixed mount dampener utilizing a helical spring dampener incorporated into bushings 44 and 46. This embodiment which may be utilized with brackets illustrated in FIGS. 2-8. The mounting plate 12 would be secured to the floor joists as previously discussed. The dampening doughnuts 44 and 46 would be positioned as previously discussed with them being capped with washers 54 and 56. In this version, an eyebolt 51 is positioned through central aperture 32. Eyebolt 51 has a washer positioned at its eye end, followed by a rebound dampener 53, which encapsulates a lower cap member 75 with center aperture secured to tube 59. Eyebolt 51 extends through cap 75 and tubular member 59 having sleeve bearings 61 and 63 at each terminus secured by an upper cap 76 with center aperture. Eyebolt 51 then extends through a helical biasing spring 65, which is capped with spring cap member 67 friction reducing thrust washer 69 and nut 71. In this version, the rebound dampener, and doughnut dampeners in cooperation with the helical biasing spring, absorb vibration, shock, and motion.

Figure 11:
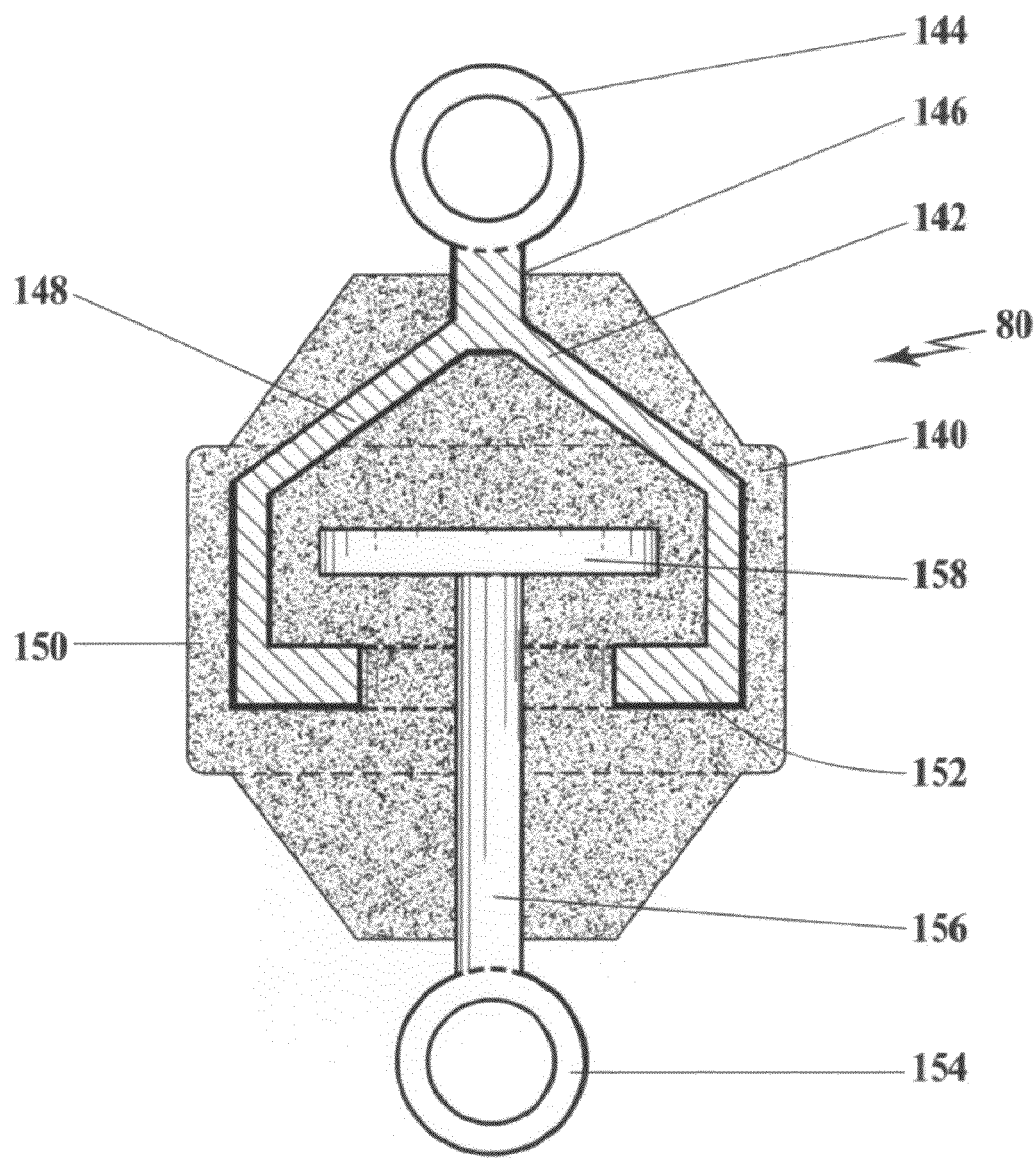
FIG. 11 is a second embodiment of an inline dampener.

FIG. 11 is another version of the inline dampener 80. FIG. 11 is a cross sectional view in which the two support elements are completely encapsulated within an elastomeric material 140 or the equivalent. The upper member 142 has an eye ring 144, secured to a shaft 146, which is secured to a conical member 148, the lower terminus of which form a cylindrical side wall 150 terminating with an annular base member 152. The lower support member comprises an eye ring 154 with a shaft member 156 which terminates with a disc member 158, the diameter of which is such that it extends and overlaps the annular base member 152 of upper member 142, but is spaced apart there from by the elastomeric encapsulating material.

Figure 12:
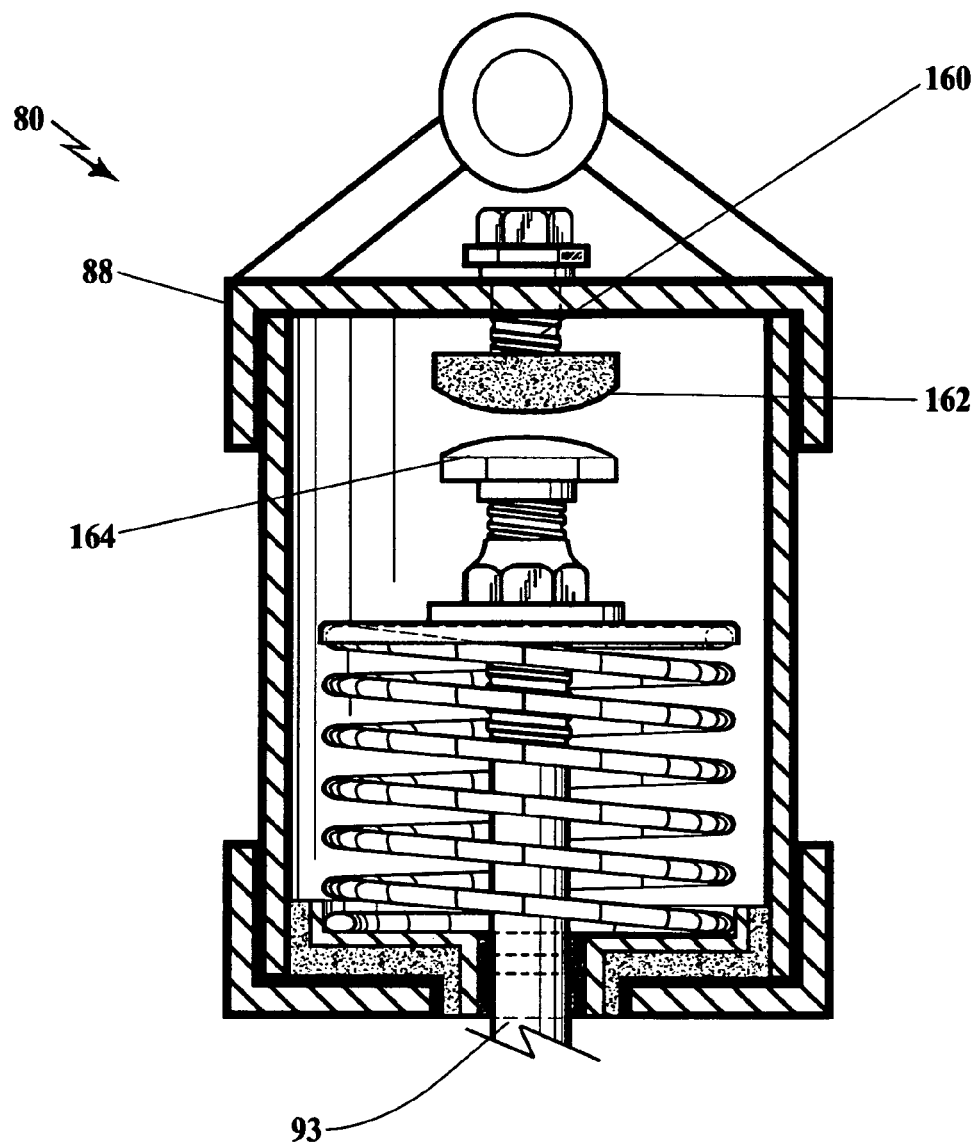
FIG. 12 is a third embodiment of an inline dampener.

FIG. 12 is another embodiment of the inline dampener 80, which could be deemed identical to the inline dampener illustrated in FIG. 9, with the exception that there is an additional dampening system within the housing 82. This dampening system comprises a downwardly depending adjustable fastener 160 extending through the upper cap member 88 terminating with an elastomeric dampener 162. The upwardly depending clevis and/or eyebolt 93 has rotatably secured to its upper end, a threaded cap 164, the caps selectively contacting each other so as to absorb shock, motion and vibration.

Figure 13:
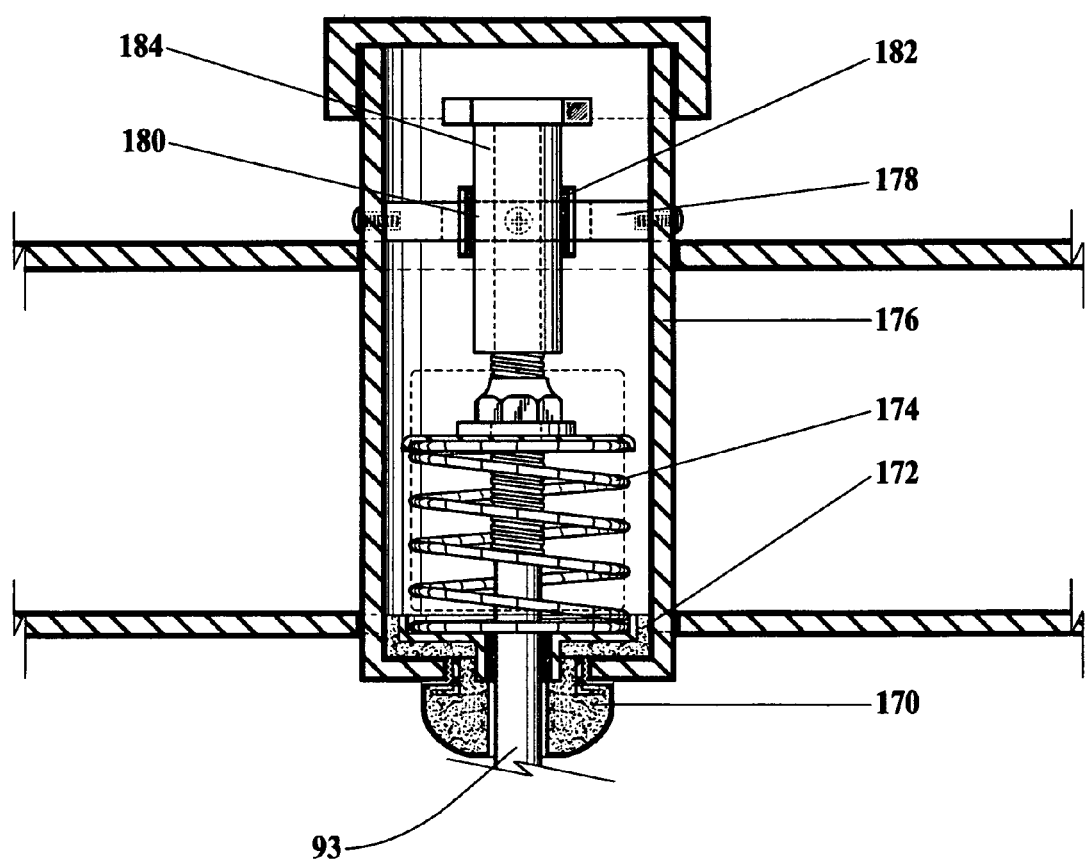
FIG. 13 is another embodiment of a fixed mount dampener.

FIG. 13 is a fixed mount dampener which is similar to the dampener illustrated in FIG. 9, as an inline dampener, but adapted to be a fixed mount dampener. A clevis or eyebolt 93 is utilized with the rebound dampener 170, internal elastomeric dampener 172, and helical biasing means 174, with friction reducing thrust washer, cap, and nut. There is disposed within the housing 176 a disc member 178 having an aperture 180, the aperture having disposed therein a bearing surface 182. There is secured to the threaded end of the clevis or eyebolt a threaded cylindrical member 184 which extends through aperture 180. In this configuration, the fixed mount dampener is mounted to the structural support. The force imparted onto the heavy bag supported by the fixed mount dampener is absorbed by the rebound dampener, elastomeric material, helical biasing spring, and the motion of cylindrical member 184 against the bearing surface 182. This particular embodiment could be further dampened by substituting the opposing elastomeric dampener caps 162 and 164 as illustrated in FIG. 12.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A mounting and dampening system for the vertical positioning of a heavy bag for athletic purposes, the system minimizing the shock, motion and vibration to the overhead securing structure, the system comprising:

a mounting bracket having a mounting surface, the mounting surface having an aperture there through, said aperture having prescribed there about, a circumferential side wall on both an upper surface and lower surface of said mounting surface, said circumferential side wall defining an annular surface about said aperture, said mounting bracket having a plurality of slotted apertures for the receipt of securing means to fasten said mounting bracket to an overlying support surface, said circumferential sidewalls on said mounting surface maintain upper and lower doughnut-shaped dampening bushings positioned about said aperture on said upper and lower surface of said mounting surface said doughnut-shaped dampening bushings maintained and compressed by a threaded support member extending there through having a plurality of washers and a securing nut for compression of said doughnut-shaped dampening bushings and support of said heavy bag, said threaded support member securing and supporting an inline serial dampener.

2. The mounting and dampening system in accordance with claim 1 wherein a helical biasing means is positioned above said doughnut-shaped dampener bushing and secured by said threaded support member to further minimize vibration, shock, and motion.

3. The mounting and dampening system for the vertical support of a heavy bag in accordance with claim 1 wherein said inline serial dampener depends from said threaded support member, said inline serial dampener comprising a housing member having an intermittent sidewall with at least one access window, said inline dampener having a removable upper wall and connector and a removable lower wall having an aperture there through, said inline dampener having positioned therein, a biasing means, there depending from the inline dampener, a threaded support member extending upwardly through said lower wall of said inline dampener, and through a sleeve washer and said biasing means, and secured by a friction reducing thrust washer/bearing and nut each of which is accessible through said at least one access window to adjust the tension and compression on said biasing means, said lower end of said threaded support member having a connector means for receipt of a heavy bag.

4. The mounting and dampening system in accordance with claim 3, wherein said inline dampener further comprises a dampening bushing positioned on its lower end having an aperture there through to accommodate said threaded support member.

5. The mounting and dampening system for the vertical positioning of a heavy bag in accordance with claim 4, wherein said dampening bushing is of one piece snap construction having an inner portion and an outwardly extending portion functioning as a rebound bumper for the absorption of shock, motion and vibration.

6. The mounting and dampening system for the vertical positioning of a heavy bag in accordance with claim 5, wherein all dampening components are formed of dampening materials comprising elastomeric polymers, encapsulated gas, encapsulated gel, or liquids.

7. The mounting and dampening system for the vertical positioning of a heavy bag in accordance with claim 2, wherein said biasing means comprise dampening springs comprised of metal or elastomeric polymer in single or multiple arrangement.

8. An inline serial dampening system for the vertical positioning of a heavy bag for athletic purposes, the inline dampening system minimizing shock, motion, and vibration to the overhead securing structure, the inline dampening system cooperable with existing mounting brackets, the inline dampening system comprising:

a housing member having an intermittent sidewall with at least one access window, an inline dampener having a removable upper cap and a removable lower cap, said upper cap having a connective end cooperable with a support fastener for securing the inline dampener to a mounting bracket, said inline bracket further having a biasing member positioned within the housing, and depending from the lower end of the housing having a connective end for support of a heavy bag, said connective end having an upwardly extending threaded shaft member extending through said lower wall of said housing member and through said biasing member and secured to said biasing member by a friction reducing thrust washer/bearing and nut assembly accessible through said at least one access window for adjusting the compression and tension of said biasing member.

9. The serial dampening system in accordance with claim 8, wherein said housing member of said inline dampener further comprises a dampening bushing positioned on said lower end of said housing said dampening bushing and communication with said biasing member.

10. The serial dampening system in accordance with claim 9, wherein said lower dampening bushing extends outwardly from said lower end and is snap fit in position said extending portion serving as a dampening bumper.

11. The serial dampening system in accordance with claim 8, wherein said biasing member comprises helical springs or elastomeric polymeric springs.

12. The serial dampening system in accordance with claim 10, wherein said dampening bushings comprise elastomeric polymer, encapsulated gas, encapsulated gel or liquids.

13. The serial dampening system for the vertical positioning of a heavy bag in accordance with claim 8, wherein said upper wall of said inline dampener has a depending elastomeric bumper selectively communicatable with a stop positioned on an upper end of said threaded shaft member.

14. A mounting and serial dampening system for the vertical positioning of a heavy bag for athletic purposes, the system minimizing the shock and vibration to the overhead securing structure, the system comprising:

a longitudinally planar ceiling plate having a plurality of slots there through for the adjustable receipt of a securing means in the form of threaded fasteners to secure said ceiling plate to an overhead surface;

a horizontal mounting plate depending from said ceiling plate having an upper and lower surface and having an aperture there through, said aperture having a circumferential wall about it on said upper and lower surfaces of said mounting plate defining an annular planar surface between said aperture and said planar walls;

upper and lower doughnut-shaped dampening bushings positioned about said aperture and maintained by said annular walls;

a threaded support means extending through said doughnut-shaped dampening bushings and said aperture, said threaded support means having positioned on an upper and lower end by a plurality of washers and nut for compression of said doughnut-shaped dampening bushings;

an inline dampener depending from said threaded support means, said inline dampener comprising a housing member having an intermittent side wall with at least one access window, said inline dampener having a helical biasing member supported within said housing member, said helical biasing member having a fastening and support member extending upwardly through said housing, and said helical biasing member and secured to said helical biasing member by a friction reducing thrust washer/bearing and nut, a lower end of said fastening and support member having a support member for the receipt of a heavy bag for exercise training and athletic activity.

* * * * *